United States Patent

[11] 3,549,792

[72] Inventor Ralph R. Barclay
Camarillo, Calif.

[21] Appl. No. 716,810
[22] Filed Mar. 28, 1968
[45] Patented Dec. 22, 1970
[73] Assignee Minnesota Mining and Manufacturing Company
St. Paul, Minn.
a corporation of Delaware

[54] FREQUENCY CONVERTER PARTICULARLY PAL SYNC GENERATOR
17 Claims, 5 Drawing Figs.

[52] U.S. Cl. ........................................................ 178/5.4, 178/69.5; 328/30; 307/271
[51] Int. Cl. ........................................................ H04n 5/38, H041 7/00
[50] Field of Search ............................................ 178/69.5G, 69.5CB; 328/72, 86, 25, 30; 307/269; 84/1.19, .20, .22, .23

[56] References Cited
UNITED STATES PATENTS

| | | | |
|---|---|---|---|
| 3,140,447 | 6/1964 | Olbrych et al. ............... | 328/25 |
| 3,170,036 | 2/1965 | Baracket ...................... | 178/69.5G |
| 2,845,538 | 6/1958 | Havens et al. | |

*Primary Examiner*—Robert L. Griffin
*Assistant Examiner*—Donald E. Stout
*Attorney*—Smyth, Roston & Pavitt

ABSTRACT: A high frequency signal such as the PAL color subcarrier is modulated and the waves of the resulting sideband are used as counting pulses to count-down to the desired lower frequency to obtain, for example, vertical and horizontal sync signals. At least one wave train developed in the count-down process is used to generate, possibly by additional modulation, the modulator signal for the HF signal. The result is a fixed nonintegral proportionality between HF and LF output. Particular configurations for the counter and linking circuitry between counter and modulation circuits is disclosed.

INVENTOR:
Ralph R. Barclay
By Smyth, Roston & Pavitt
ATTORNEYS

INVENTOR:
Ralph R. Barclay
By Smyth, Roston & Pavitt
ATTORNEYS

FREQUENCY CONVERTER PARTICULARLY PAL SYNC GENERATOR

The present invention relates to an apparatus for generating at least one signal train, having a particular frequency, from signals having a second frequency which is related to the first frequency by a factor which is not an integer. The invention is more particularly concerned with the construction of a video sync pulse generator in which a predetermined relationship between a color subcarrier frequency, the horizontal line frequency and the frame and field rates have to be maintained. Particularly, for the so-called PAL system, the color subcarrier and either or both, horizontal line frequency and vertical frame rate frequency are related to each other by a noninteger. The relationship to be maintained, for example, is that the subcarrier frequency (*fsc*) is to be equal to 283.7516 the horizontal line frequency (*fh*) due to the European Broadcasting Union standards which requires $fh=4fsc/(1135+4f_{fr}/f_h)$, with $f_{fr}$ being the frame rate.

The system, in accordance with the present invention, is constructed in the following manner. A high frequency source which can be regarded as the master frequency source of the system from which other frequencies are to be derived, is modulated with an auxiliary frequency and only one sideband of the frequency modulation output is used. Modulation, in general, can be regarded as a wave mixing process in which the frequencies of input signals are added and/or subtracted and either by filtering or by single sideband, suppressed carrier modulation with phase shift, the output signal of the modulator has frequency which is either the sum or the difference of the input frequencies. The production of such sidebands depends on the interrelationship of sinusoidal waves so that mixing is an AC process, whereby spectral purity of the output sideband requires that the input signals have few or no harmonics. The resulting sideband signal is supplied to a counter in that each wave of this second auxiliary frequency is construed as a true signal followed by a false signal and in an alternating sequence. The true signals can be regarded as pulses and these pulses are counted down by a digital counter to obtain the desired frequency. The sideband signal serving as input for the counter has thus a frequency which is an integral multiple of the counter output frequency, the integer being the count number. This count-down process is done in sequential stages and particularly in such a manner that at least some of the counted-down frequency signals (possibly of even lower count than actually needed for the output frequency) are low frequency pulse trains with alternating true and false periods of equal length.

If the system is used as sync signal generator, horizontal sync signals are derived from this count-down device. Since horizontal sync pulses and frame rate are related by an integer, vertical field and frame rate signals can be likewise derived from this count-down process.

Pulse train signals of particular frequencies are derived from the counter, and they are mixed to obtain sum or difference of the respectively mixed frequency as needed with the resulting sideband being used as the first mentioned auxiliary frequency. The general case required this mixing of frequencies derivable from the counter to obtain the above-mentioned auxiliary frequency. However, in special cases the needed auxiliary frequency may directly occur in the counter.

The invention, therefore, uses basically digital techniques to provide low frequency signals from a high frequency master source type signal by a count-down process, but in view of presumed noninteger relationship between the two frequencies, a modification is needed by modifying the high frequency which has to be counted down. This modification is done by positive and negative frequency summation of signals having appropriate frequencies and being derived from the counter, to obtain a sideband from the high frequency of the master source which sideband can be counted down directly, as the generated sideband frequency is selected to be related to the desired low frequency by an integer as proportionality factor.

The digital count-down device preferably includes cascaded stages to use basically binary techniques. Modification of straightforward binary count-down, if required for the general case, will be discussed below. Nevertheless, the counter includes stages oscillating at frequencies which are relatable to each other and/or to the input or output frequencies of the counter on a binary scale, directly or nearly so. Desired auxiliary frequencies can be additively composed from them because any number can be expressed on a binary or a closely related scale, using the different frequencies developed by the counter as bivalued bits of different significance to compose a frequency which is used as modulator signal for the master frequency and to generate the sideband related to the desired low frequency by an integer. As will be developed more fully below, the sideband frequency employable for counting down horizontal and vertical sync pulses differs from the PAL color subcarrier by a (auxiliary) frequency that can be expressed as $f_h/4+f_{fr}$.

The count-down process is preferably done by a modified binary counter employing essentially the usual cascade of toggle flip-flops. This, however, would produce only a reduction in frequency by a proportionality factor between input and output frequencies which is a power of two. It may be possible to select the sideband frequency at the counter input accordingly but this cannot be relied upon for the general case. A nonpower of two integer is counted out by deriving differentiated pulses from one or several stages particularly at the low frequency end of the chain when the particular stage changes state. These pulses are then used to force one or several of the higher frequency stages back into the state out of which conversion just took place (which conversion propagated to the lower frequency stage and resulted in the differentiated output pulse). This way a selected number of input pulses is subtracted for obtaining a full cycle of the stage at the highest order at less than the number given by the power of two of the number of cascaded stages employed, whereby it is necessary to make sure that those stages producing output signals to be used in the mixer or modulator have equal at alternating true and false periods or that signals of that nature can readily be derived therefrom.

Phase shifting-type single sideband suppressed carrier modulators are preferably used. It is thus necessary to provide pairs of input signals for the modulator with a 90° phase shift between the signals of a pair. As the input signals are derived from the digital counter, digital techniques are preferably used to obtain the 90° phase shift as the resulting accuracy is determined by the accuracy with which the input frequency of the digital counter which is a high frequency source is maintained constant.

While the specification concludes with claims particularly pointing out and distinctly claiming the subject matter which is regarded as the invention, it is believed that the invention, the objects and features of the invention and further objects, features and advantages thereof will be better understood from the following description of the preferred embodiment, which is a PAL system sync pulse generator, taken in connection with the accompanying drawings in which:

Figure 1:
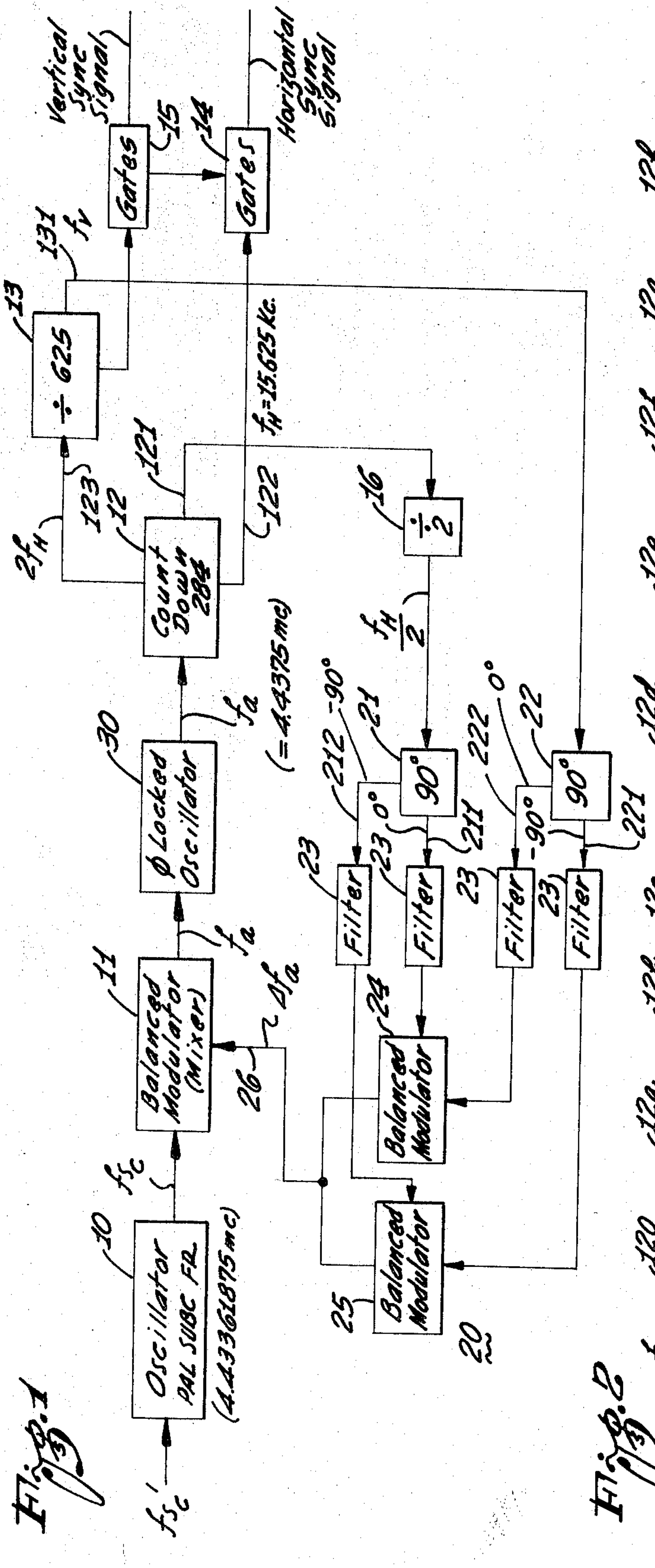
FIG. 1 illustrates a block diagram of a sync signal generator for the PAL system.
Figures 2, 4:
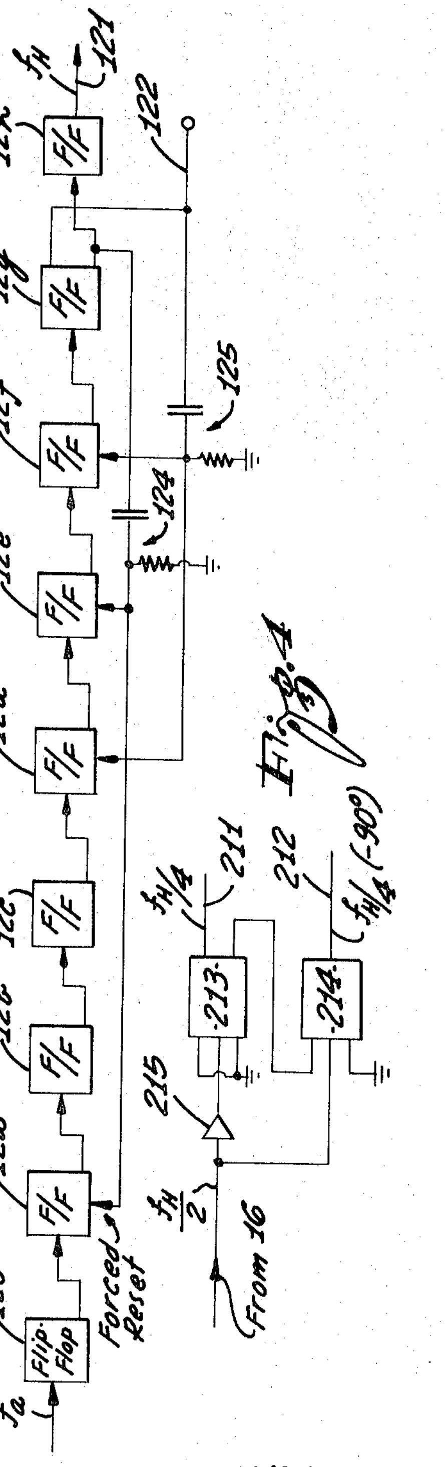
FIGS. 2 and 3 illustrate block diagram of modified binary count-down devices for respectively producing the horizontal and vertical sync pulses in the system shown in FIG. 1.
Figure 2A:
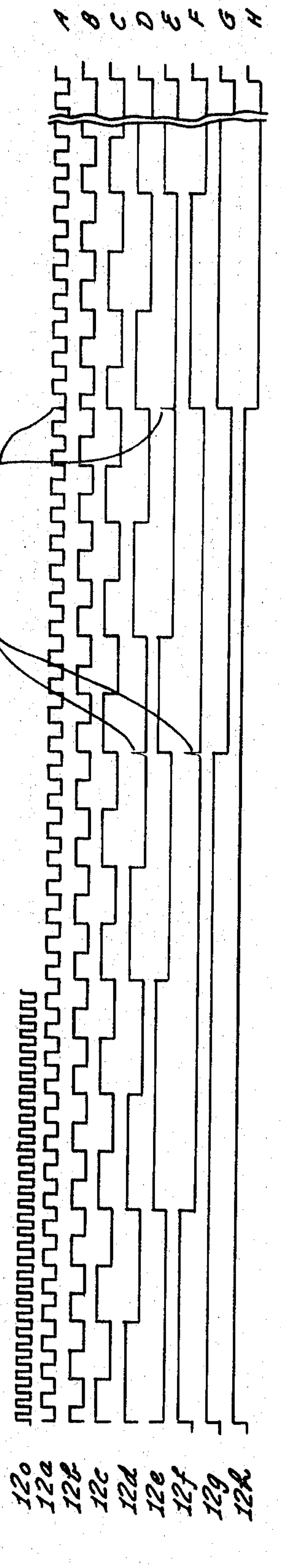

FIG. 2*a* shows a pulse diagram of pulses developed in the counter of FIG. 2; and FIG. 4 illustrates a block diagram of the circuit employed to digitally produce input signals for balanced modulators employed in the circuit shown in FIG. 1.

Proceeding now to the detailed description of the drawings, in FIG. 1 is a block diagram in accordance with the preferred embodiment for practicing the invention in the preferred environment of usage and application. The system is a sync generator, specifically a sync generator for the PAL color TV system. A color TV system, as was mentioned above, requires basically three different operating frequencies which are independent from the particular carrier frequency of signal transmission and broadcasting. These frequencies are, for the Pal system as presently practiced, (1) the vertical sync pulse frequency $f_v$ equal to a field rate of 50 c.p.s. for a frame rate $f_{fr}$ of 25 c.p.s., (2) the horizontal line rate frequency $f_h$ of 15.625 kc. and (3) the color subcarrier frequency $f_{sc}$ of the PAL system which is 4.43361875 mc.

The field rate of 50 c.p.s. is related to the horizontal line rate frequency $f_h$ by the factor of 312 ½ with the double horizontal line frequency being related to the field rate by the factor of 625 accordingly. One can, therefore, see that these two frequencies can be converted to each other by counting techniques, using the higher frequency as counting unit. Thus, the vertical sync frequency can be derived from double the horizontal line frequency by a digital count-down process. However, the subcarrier frequency is not related to the horizontal line rate frequency by such a rather simple relation. As was mentioned above, the relation in accordance with the PAL standards is as follows: $f_h = 4 f_{sc}/(1135 + 4/625)$. This relation can be rewritten as $f_h = (f_{sc} - f_{fr})/283\ ¾$. Therefore, as these frequencies are generated from each other, this relationship must be fulfilled and maintained. The signal generator providing the signals in a manner that maintains this function relationship is illustrated in FIG. 1.

The principal input element, or master clock, so to speak, of the system, is an oscillator 10 producing the PAL subcarrier frequency $f_{sc}$ mentioned above and having value of 4.43361875 mc. Source 10 may be the only locally generated original frequency of the system. However, it should be mentioned that oscillator 10 may be a phase locked oscillator receiving a signal $f_{sc}$ of equal frequency and generated elsewhere in a master clock, to phase lock the several color subcarrier oscillators within a broadcasting system to a central station. It is for this reason that one uses a phase locked oscillator for the color subcarrier as the principal master clock or master oscillator of the system to permit optional linking of the station of which the sync generator is a part, with a sync generator of a central station operated for the benefit of the individual broadcasters who may be part of the network.

The output signal of oscillator 10 with frequency $f_{sc}$ is provided to a balanced modulator system or mixer 11 receiving as modulator signal an auxiliary frequency signal of a line 26. This modulator frequency $\Delta f_a$ is synthesized in a manner described below. The modulator frequency is, for example, 3.88125 kc. The balanced modulator system 11 operates in such a manner that its output is the upper sideband of the modulated carrier, i.e., the output frequency of modulator 11 is the sum of the input frequencies $f_{sc}$ and $\Delta f_a$ which sum is 4.4375 mc. for the values stated above.

The significance of the auxiliary sideband signal frequency $f_a$= 4.4375 mc. is that it is an integral multiple of the horizontal line rate frequency, namely, $f_a = 284 \times f_h$. Thus the purpose of balanced modulator 11 is to generate this auxiliary frequency $f_a$ by mixing the color subcarrier and an auxiliary signal to obtain a frequency which is an integral multiple of the horizontal line frequency.

The output signal of modulator 11 drives a phase locked oscillator 30 producing also the auxiliary signal frequency $f_a$. The output of oscillator 30 is fed as a trigger signal to the input flip-flop of a digital count-down stage 12, detailed features of which will be described more fully below with reference to FIG. 2. The sinusoidal input signal of frequency $f_a$ (in the following called signal $f_a$ for short) is converted into a rectangular pulse wave that is applied to the first stage of digital count-down device 12, to obtain a signal frequency $f_a/2$ and succeeding stages are interconnected to progressively count-down the input signal wave pulses.

The count-down device 12 produces a pulse train in an output line 121. The pulse train is defined by oscillatorily alternating rectangular pulses of equal duration. The frequency of that pulse train is $f_h$. Thus, the signal level in line 121 alternates between two levels at an oscillation frequency of 15.625 kc. whereby succeeding half waves of opposite polarity have equal duration.

The penultimate stage within the count-down chain 12 alternates its state at a frequency of $2f_h$. This particular signal is withdrawn from the count-down device 12 through a line 123 and passes as a pulse train to a second count-down device 13, reducing the frequency of the signals as applied to it by the factor of 625 kc., to produce a pulse train of 50 c.p.s. in an output line 131. Details of count-down device 13 are described below with reference to FIG. 3. It should be mentioned that the output pulse train of count-down stage 13 is also a rectangular wave train in which a true period of half the oscillation period is followed by a false period of the same duration. Therefore, the respective output signals of the count-down stages have a very strong, dominating sinusoidal fundamental equal to the desired output frequency with a relatively low content of harmonics.

The output signals in channels 121 and 131 are not used directly as generated sync signals, because sync signals have short durations followed by relatively long pauses. Instead, suitable signals are drawn from count-down devices 12 and 13 through lines 122 and 132 (multiple) to operate suitable gating networks 14 and 15. The configuration of those gates is not of immediate importance for the invention and is, therefore, dealt with here only summarily. The gating device 14 is, therefore, the horizontal sync signal generator proper. It receives the horizontal line frequency and, additionally, higher frequency signals drawn from intermediate stages of the count-down device 12. Through appropriate gating the generator 14 provides the desired waveform for the horizontal sync pulses proper for the blanking pulses and for the equalizing pulses. Cross-linking to gates 15 limits production of the equalizing pulses and vertical sync pulses (at twice the horizontal line rate) to the vertical sync pulse period.

Analogously the gating network 15 constitutes the vertical sync pulse generator proper. Network 15 receives a 50 c.p.s. pulse train as generated in counter 13, and higher frequency components are derived from intermediate stages of the count-down device 13 to provide the vertical interval information to gates 14. Gates 15 also provide the vertical drive pulses. In view of the fact that very high resolution signals are available as logic signals (namely, up to about 4 mc.), the several required periods for horizontal and vertical sync signals can be established readily for durations at that accuracy, as all lower frequency signals in the count-down devices 12—13 have that accuracy.

The output waves in lines 121 and 131 respectively having frequencies $f_h$ and $f_v$ are passed to a modulator system 20 to establish single sideband suppressed carrier modulation through phase shift. The line 121 first leads to a toggle flip-flop 16 which could be regarded as a post stage of the count-down device 12, producing, therefore, a count-down to $f_a/568$. The output of element 16 is a rectangular wave train of frequency $f_h/2$ (for specific reasons below one could not use the first stage of counter 13 for that purpose). The output signal of flip-flop 16 is fed to a network 21 to be described more fully below with reference to FIG. 4. Network 21 has two output lines 211 and 212, both receiving signals of frequency $f_h/4$ but at a 90° phase shift.

There is an analogous network 22 provided to receive the 50 c.p.s. signal in line 131 and it provides a 25 c.p.s., i.e., a frame rate signal into two output lines 221 and 222. The signals in lines 221 and 222 have equal frequency, but they differ also by a 90° phase shift. A plurality of filters 23 is provided, one in each of these output lines 211, 212, 221 and 222, in order to remove harmonics and to obtain sinusoidal signal of the respective frequency and phase.

The signal in line 211, after filtering, is combined with the signal in line 222, in a balanced modulator 24 while the signal in line 221 is combined with the signal in line 212 in a second balanced modulator 25. The outputs of the balanced modulators 24 and 25 are combined in the output channel 26 to form a lower sideband suppressed carrier signal. Due to the particular combination of modulating signals the carrier and upper sideband are suppressed. In terms of symbols the sideband in channel 26 is a signal having a frequency of $f_h/4 - f_{fr}$ which for the given numbers is a signal of 3.88125 kc. It will be recalled that this was the auxiliary frequency $\Delta f_a$ needed to obtain auxiliary frequency $f_a$ from the color subcarrier. Thus, output channel 26 of the modulator system 20 provides the modulator signal needed by modulator system 11 to provide sideband $f_a$.

It can thus be seen that the auxiliary frequency $f_a$ can be algebraically formed as a sideband frequency of the color subcarrier frequency, using as determining additive component a frequency derived from the count-down device in general through frequency addition. The cascaded modulation has produced, in fact, $f_a = f_{sc} + f_h 4 - f_{fr}$. The frequency $f_a$ in turn is related to the frequencies $f_h$ and $f_{fr}$ by division with integers; the division is obtained through digital count-down producing $f_h = f_a/284$ and $f_{fr} = f_a/284 \times 625$. Eliminating $f_a$ from the relations one obtains $284 f_h - f_h/4 = f_{sc} - f_{fr}$ which is the desired and required relation among the several frequencies presently established by the closed loop as described.

It should be mentioned that the output line of balanced modulator system 11 could be connected directly to the count-down device 12. But the modulator signal $\Delta f_a$ is not available until at least the first vertical sync pulse cycle has been counted. Oscillator 30 produces $f_a$ directly, and after the count-down has started the loop forces the oscillator in frequency and phase synchronism. Thus, utilization of a phase locked oscillator 30 is advantageous in order to start the system.

Neither one of the count-down devices 12 or 13 operates by counting down straightforward binary numbers because the proportionality factors involved in the frequency reduction are not numbers expressible by a single power of 2. Furthermore, it will be recalled that some of the low frequency, rectangularly shaped waves should be composed of true and false pulses following each other regularly and have equal durations. This is particularly true for these waves which are used in the modulators for the formation of sidebands as required; the sidebands should have narrow bandwidth. Particulars to obtain this objective are illustrated more fully in FIG. 2, representatively showing the count-down device 12.

The count-down device 12 is comprised of cascaded flip-flops which can be described as toggle flip-flops 120, **12*a* through 12*h*. For mechanization they are preferably of the JK type with permanently gated open set and reset input terminals and cascading through the clocking input to permit toggle operation. Specifically, the flip-flops are interconnected to form a binary chain, the connection being reset output terminal to clock input terminal. Therefore, the flip-flop 120 receives as a clock signal the signal of frequency $f_a$ for this particular case. Its reset output side is connected to the clock input of flip-flop 12*a*, the reset output side of the latter is connected to the clock input of flip-flop 12*b*, etc., and the output of flip-flop 12*g* connects to the clock input of flip-flop 12*h***, the output of which is a signal having frequency $f_h$ at the desired wave shape.

Without further measures the digital count-down provided by these nine stages would be $2^9$, corresponding to a frequency division by 512, which is the highest number of cycles that can be counted with a nine-stage binary counter on a cyclic basis.

However, a frequency reduction by 284 only is desired. This means that instead of 512 cycles of input pulse train $f_a$ for producing one cycle of $f_h$ (flip-flop **12*h***), only 284 cycles of $f_a$ should be used. The number 284 can be composed out of the number 512 in that $284 = 512 - 238$; i.e., 238 $f_a$ cycles have to be suppressed during one $f_h$ cycle. The number 238 can be expressed by power-of-two components, $238 = 128 + 64 + 32 + 4$. This can be utilized in the following manner. JK flip-flops have usually a forced reset input terminal in addition to the regular, clock pulse controlled reset gating terminal; when a signal of appropriate polarity is applied to the forced reset terminal, the flip-flop can be pulled down and forced into the reset state, independent from the state of the regular, clock pulse controlled reset gating terminal.

Without further measures flip-flop **12*h* would go through one full cycle for 512 cycles of the input rate, as state. Flip-flop 12*g* would require 256 cycles of input signal $f_a$ for one of its cycles, flip-flop 12*f* requires 128 input wave cycles for one of its cycles, etc. To state it differently, during one-half wave of flip-flop 12*f*, there appear normally 64 input waves of frequency $f_a$ before the flip-flop can change state again. However, by suppressing one-half wave of flip-flop 12*f*, one deducts 64 waves $f_a$ from the count to complete one cycle of flip-flop 12*h* (output frequency $f_h$). Upon suppressing 64waves of frequency $f_a$ twice during each full cycle, 128 waves $f_a$ have, in fact, been subtracted from the full count required to complete one ($f_h$) cycle of flip-flop 12*h***.

Inasmuch as the alternating true and false periods of flip-flop **12*h* should not be very unequal, the subtracting of 128 waves $f_a$ should not be done during one-half wave period of flip-flop 12*h* alone. Full symmetry is obtained if 64 waves $f_a$ are subtracted during each half wave of flip-flop 12*h*. This is obtained by suppressing twice one-half wave of the flip-flop 12*f* during each full cycle of the flip-flop 12*h*. For reasons above, additional 64+32+4 waves $f_a$ are to be subtracted from the total count to complete a full output cycle of flip-flop 12*h*. Thus, analogously one-half wave of each of the flip-flops 12*a*, 12*d* and 12*e* are to be suppressed per half wave of flip-flop 12*h*, respectively corresponding to a subtraction of 4, 32 and 64 input pulses or waves $f_a$ before the completion of one full cycle of flip-flop 12*h***.

The selective suppression of particular half waves is obtained in the circuit by coupling the reset output side of the flip-flop **12*g* through a differentiator 124 to the forced, or pull down reset input side of flip-flops 12*e* and 12*a*. The set side output of flip-flop 12*g* is coupled through a differentiator 125 to the forced reset input side of flip-flops 12*d* and 12*f*. As flip-flop 12*g* changes state, all preceding flip-flops have just changed from the reset to the set state, which change of states has propagated through the chain of flip-flops and reflects in the output of flip-flop 12*g*. Depending on the direction of change of flip-flop 12*g*, two of the flip-flops preceding flip-flop 12*g* are immediately pulled "back" into the reset state to suppress, within their normal cycle, one-half wave. This occurs once during each half wave of flip-flop 12*h*, because flip-flop 12*g* runs through two cycles per cycle of flip-flop 12*h***.

Flip-flops which are directly interconnected should not be force-reset simultaneously as that could immediately set again the respective succeeding one of the two. This is the reason why, for example, flip-flop **12*e* should be reset at times other than flip-flops 12*d* and 12*f*. Flip-flop 12*a* could be reset from either differentiator, but for reasons of loading differentiator 124 is used. As a consequence of the operation of the circuit, the "reset through feedback" diminishes the number of $f_a$ waves per cycle of flip-flop 12*h*** to the desired value of 284.

Circuit 13 (FIG. 3) is analogously constructed. The circuit provides a count-down of the frequency $2f_h$ by the number 625. The output of flip-flop **12*g* (FIG. 3) can thus be used as input for the count-down device 13**. The next highest power-of-two in relation to 625 is $2^{10} = 1024$, so that 10 stages are required. In order to obtain 625 counting cycles $399 = 256 + 128 + 8 + 4 + 2 + 1$ cycles have to be subtracted from the 1024 cycles required for recycling a straightforward binary counter. As the number (399) by which the next highest power-of-two number ($2^{10}$) is to be reduced in terms of pulse counts is odd, one cannot subtract an equal number of cycles during each half wave of the highest significant stage. Thus, full equality of set and reset states of the flip-flop of highest digital counting significance is not possible. This, however, is no disadvantage as will be shown shortly.

Figure 3:
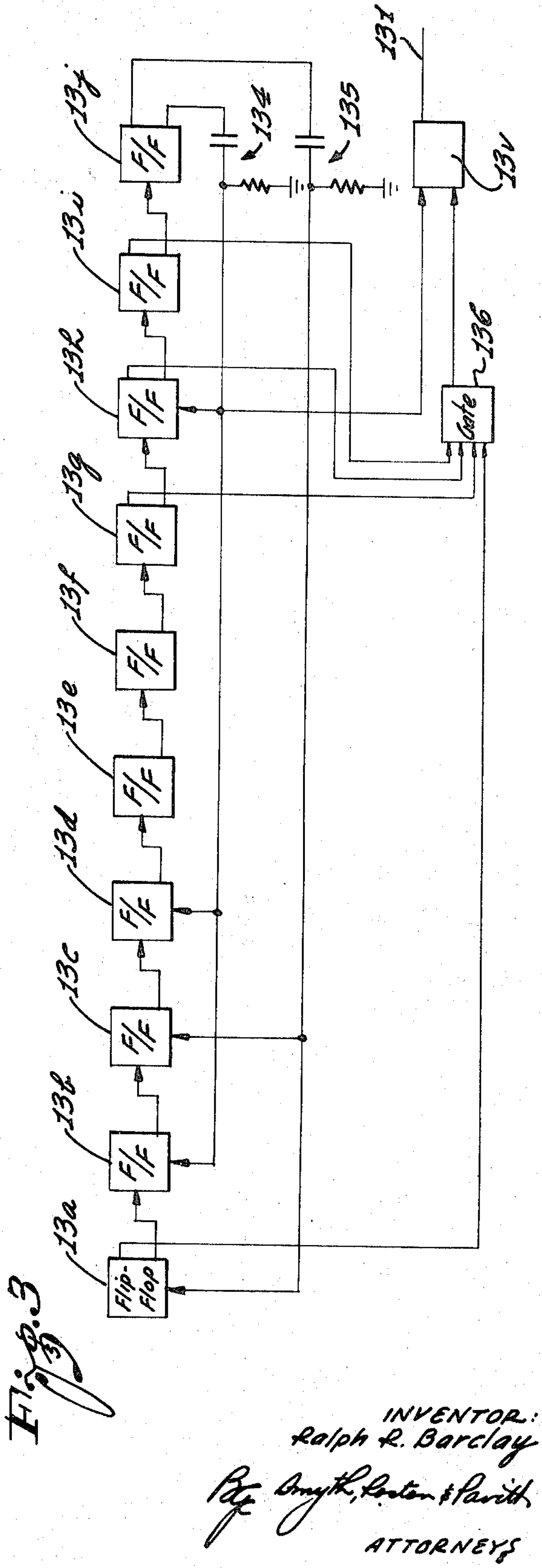

In FIG. 3 count-down stages **13*a* through 13*j* are the principle active elements of counter 13. Stage 13*j* oscillates at the desired output frequency, which is the vertical sync pulse rate frequency $f_r$. Inasmuch as full equality of duration of the half waves of flip-flop 13*j* cannot be established, different pulse counts are subtracted from each of its half waves. The output side of flip-flop 13*j* itself (and not of the next lower stage as in FIG. 2) are connected to differentiators 134 and 135 respectively, providing control pulses when flip-flop 13***j* changes from reset to set state and from set to reset state. Differentiator 135 is coupled to the forced-reset inputs of flip-flops 13*a*, 13*c* and 13*i*; to respectively suppress 1, 4 and 256 input pulse counts (as applied to stage 13*a* ) during the negative half wave of flip-flop 13*j* . Differentiator 134 is coupled to the forced-reset inputs of flip-flops 13*b*, 13*d* and 13*h* to respectively cause 2, 8 and 128 input pulses to be suppressed for completion of counting the positive half wave duration of flip-flop 13*j* .

The result is a somewhat unbalanced oscillation period of flip-flop 13*j* as far as duration of the two half waves is concerned (374 vs 251 pulse counts for positive and negative half waves). This is of consequence neither for the production of the vertical sync signals nor for the utilization of an output of count-down device 13 as an input for a modulator. A balancing flip-flop 13*v* of the set-reset type is provided to establish oscillations of equal duration half waves at frequency $f_r$ . Flip-flop 13*v* is set when flip-flop 13*j* sets, in that differentiator 134 is connected to the set side input of flip-flop 13*v* . The flip-flop 13*v* is reset at pulse count 313, monitored by a gate 136. That accuracy has proven to be sufficient. However, one could couple gate 136 additionally to one of the stages of count-down device 12 to reset flip-flop 13*v* at count 312 ½ as far as count-down circuit 13 is concerned, to further improve accuracy of the signal fed via line 131 to modulator 20.

The circuit network 21/of modulator 20 in FIG. 1 is illustrated in FIG. 4 in greater detail. The circuit is similar to the circuit network 22, so that only one of them has to be described in detail. There are provided two JK flip-flops 213 and 214 respectively. The flip-flop 213 has permanently gated open set and reset inputs to permit a change of state for each clock pulse it receives. Thus, flip-flop 213 is operated as toggle flip-flop, and this clock pulse is derived through an inverter 213 from the output signal of the stage 16 (see FIG. 1) which changes states at frequency $f_h/2$. Therefore, in this configuration the flip-flop 213 operates as a mere frequency divider stage to produce a signal of the frequency $f_h/4$. In this respect flip-flop 213 could still be regarded as further extension of the count-down device 12, which, up to this point, is extended by the flip-flops 16 and 213. As was mentioned above, flip-flop 16 has to be provided for, even though $f_h/2$ appears also in count-down device 13, stage 13*a* . However, as can be seen in FIG. 3, there is an occasional suppression of a half wave of that stage. For this reason flip-flop 13*a* cannot be used to provide the continuous wave input for modulator 20 needed.

The purpose of the device 21 is to produce two signals of $f_h/4$ frequency with a 90° phase shift between them. This is obtained by coupling the output of flip-flop 16 directly to the clocking input of a second flip-flop 214. Thus, flip-flop 213 changes state normally at the rising clock (output of flip-flop 16) whereas a flip-flop 214 changes state at the falling clock, which produces the desired 90° phase shift between flip-flops 213 and 214. Additionally, the reset output of flip-flop 213 is coupled to the set input side of flip-flop 214. The flip-flop 214 is to be set only when the flip-flop 213 is already in the set state. This connection ensures that the desired phase relationship between the two flip-flops 213 and 214, is properly obtained from the beginning and that no ambiguity can creep into the system due to a, possibly, undefined initial state of the flip-flops 213 and 214 when power is turned on.

It will be appreciated from the foregoing that the balanced modulator 20 in FIG. 1 operates (prior to filtering) with square wave inputs, but, of course, its function proper is the processing of sinusoidal input signals. Moreover, single side-band modulation with carrier suppression without output band-pass filtering (except for noise reduction and spectral purity enhancement) is dependent upon the input signals having pairwise precisely 90° phase shift. That phase shift must be maintained very accurately for the modulator to work properly. The system presently explained ensures this 90° phase shift on the basis of digital techniques. It can be seen that the accuracy of a 90° phase shift depends on the regularity of the clock pulse train applied to this network 21 which is the output of the flip-flop 16, i.e., the false and true periods of that flip-flop 16 must be exactly equal as that defines the 90° phase shift between the output wave.

The accuracy with which the output signal of flip-flop 16 maintains equality as to succeeding true and false periods is simply determined by the accuracy of phase and frequency of the input signals of the count-down device, i.e., by the accuracy with which the frequency $f_a$ is maintained constant as far as the modulator 30 is concerned. This is an accuracy well below 1° electric for the output of circuit 21. The input frequency of the count-down device 12 and the input frequency for the modulator 20 (which is the input frequency for the device 21) follows a ratio of about 500 .

With regard to device 22 (constructed similarly to 21 and receiving the output of flip-flop 13*v*, supra) it will be recalled that here the accuracy of equality of succeeding true or false states was obtained by one-half pulse count of the input of count device 13, which is approximately an accuracy of .2 percent degrees electric as to the phase shift between the output waves in lines 221 and 222, which amply suffices for the modulator. Moreover, it was mentioned above that the accuracy of the half waves produced by flip-flop 13*v* in FIG. 13 can be improved by introducing the accuracy of count-down device 12 into the input system for circuit 22.

The output signal of count-down device 12 proper (which is the alternation of states of flip-flop 12*h*) has half waves of equal duration, because the count-down frequency is an even number (284) so that half of the $f_a$ waves can be subtracted from each output half wave then counted out. This was thus a particular circumstance based on the particular numbers used. Should the output of the count-down stage have unequal half waves (as has stage 13*j*) either a balancing flip-flop (such as 13*v*) has to be employed, unless further frequency reduction is contemplated as in FIG. 2 by state 16. The output signal in form of alternating true-false states have half waves of equal duration as long as the particular trigger edges used at the input side of a flip-flop in general follow each other at a constant rate. The input waves themselves applied to such a flip-flop need not to have equally long true and false states. This is mentioned here because for purposes of generalization, it is the output of flip-flop 16 as last stage of the digital count-down process which is used here as one input for the modulator 20, the input of flip-flop 16 does not have to be a pulse train of equal duration half waves.

The invention is not limited to the embodiments described above but all changes and modifications thereof not constituting departures from the spirit and scope of the invention are intended to be covered by the following claims.

I claim:

1. Apparatus for generating a signal train of a particular first frequency using a source of a second signal having a second frequency higher than the first frequency, the numerical values of the first and second frequencies being convertible into each other by a proportionality factor which is not an integer, comprising:

- mixer means connected to the source and responsive to a signal having a third frequency for providing a sideband signal of the second signal and the signal of third frequency, the signal of third frequency not having a frequency related to the first or the sideband frequency by an integer as a proportionality factor;
- cyclically operating digital counter means connected to receive the sideband signals and to progressively count pulses of the sideband signals to obtain a pulse train having the first frequency with the number of pulse counts per counting cycle being related by an integer to the number of cycles of the sideband signals, the digital means including interconnected counting stages operating at different cycle rates representative of countdown progression; and third means connected to said digital counter means to receive therefrom at least one wave train and forming therefrom said third frequency signals, the third means being connected to said first means for passing said third signals thereto.

2. Apparatus as set forth in claim 1;

said counter means having cascaded bistable stages having first and second states, further including first circuit means connected to the output side of at least a first one of the stages to derive therefrom a switching signal when said first stage changes states in a particular direction; and second circuit means connecting the first circuit means to at least a second one of the stages preceding the first stage in the cascade to force the second stage from a particular one of the first and second states into the other one of the first and second states for suppressing at least a portion of a period of the stage in the particular state.

3. Apparatus as set forth in claim 1, the third means including modulator means responding to at least two wave trains developed by the counter means at different frequencies to develop as the third signal a sideband of one of the two wave trains in relation to the other one of the two wave trains..

4. Apparatus as set forth in claim 3, the modulator means having, for at least one of the two wave trains, an input stage comprising two interconnected bistable states triggered by different phases of said wave train to produce two wave trains having a 90° phase shift for operation in the modulator.

5. In a system of the character described for converting a train of high frequency signals of a first frequency into a train of signals of a second frequency not integrally related to the first frequency, the combination comprising:

first means responsive to a train of signals of a third frequency not integrally related to the first and second frequencies to count them digitally down to obtain a train of fourth signals having a frequency lower than that of the train of signals of the third frequency;

second means for providing train of signals of the first frequency;

mixer means connected to the second means to receive the signals of the first frequency and further connected to the first means to receive the signals of the fourth frequency to provide signals constituting a particular sideband of the signals of first and fourth frequencies; and third means responsive to the signals provided by the mixer means for introducing these signals as the signals of the third frequency to the first means.

6. An apparatus as set forth in claim 5 wherein the third means includes a phase locked oscillator connected to the mixer means to phase lock to the signals of third frequency from the first means.

7. A sync pulse generator for providing sync pulses to be used in composite video signals, comprising:

an oscillator providing signals of a color subcarrier frequency;

a first modulator responsive to a modulator signal and being connected to the oscillator to provide a particular sideband of the subcarrier frequency;

a digital counter connected to the modulator to count pulses corresponding to sideband signal oscillations as provided by the modulator and providing first and second signal trains in response thereto;

a second modulator connected to receive the first and second signal trains to provide a modulating signal additively combining the frequencies of the first and second signals;

means for introducing the modulating signal from the second modulator to the first modulator for mixing with the signals from the oscillator to provide the particular sideband; and means connected to the digital counter to derive therefrom horizontal and vertical synchronization signals.

8. A sync pulse generator as set forth in claim 7 including means responsive to at least one of the first and second signals from the digital counter to operate in response to these signals to obtain a double pulse train of signals phase shifted by 90°, the second modulator being of the phase-shift single-sideband suppressed-carrier type and responsive to the double pulse train of phase-shifted signals to produce the modulating signals.

9. A sync pulse generator as set forth in claim 7, the digital counter including a plurality of bistable stages having first and second states and further including:

first circuit means connected to the output side of at least a first one of the stages to derive therefrom a switching signal when said first stage changes states in a particular direction; and second circuit means connecting the first circuit means to at least a second one of the stages preceding the first stage in the cascade to force the second stage from a particular one of the first and second states into the other one of the first and second states for suppressing at least a portion of a period of the stage in the particular state.

10. A sync pulse generator as set forth in claim 7 including a phase locked oscillator driven by the first modulator and providing the oscillations counted by the counter.

11. In combination in a television system for producing first signals at a vertical sync pulse frequency and second signals at a horizontal sync pulse frequency from third signals at a color subcarrier frequency not having an integral relationship to the vertical sync pulse frequency and the horizontal sync pulse frequency;

first means for providing the third signals at the color subcarrier frequency;

mixer means for mixing the third signals and fourth signals at a particular frequency not having an integral relationship to the frequencies of the first, second and third signals to produce a fifth signal from a particular sideband of the third and fourth signals;

second means responsive to the fifth signals for producing sixth signals integrally related in frequency to the fifth signals and the first signals;

third means responsive to the fifth signals for producing seventh signals integrally related in frequency to the fifth signals and the second signals and having a different frequency than the sixth signals; and fourth means responsive to the sixth and seventh signals for combining these signals in a particular relationship to produce the fourth signals.

12. In the combination set forth in Claim 11, the second means including means for producing a pair of phase-displaced sixth signals and the third means including means for producing a pair of phase-displaced seventh signals and the fourth means including means for combining one of the Phase-displaced sixth signals and one of the phase-displaced seventh signals and means for combining the other one of the phase-displaced sixth signals and the other one of the phase-displaced seventh signals.

13. The combination set forth in claim 12 wherein the mixer means constitutes a balanced modulator and the fourth means includes a balanced modulator.

14. In combination in a television system for producing first signals at a vertical sync pulse frequency and second signals at a horizontal sync pulse frequency from third signals at a color subcarrier frequency not having an integral relationship to the vertical sync pulse frequency and the horizontal sync pulse frequency;

first means for providing the third signals at the color subcarrier frequency;

second means for providing signals at a fourth particular frequency differing by a fifth particular frequency from the color subcarrier frequency where the fifth particular frequency is not integrally related to the vertical sync pulses, horizontal sync pulse and color subcarrier frequencies but the fourth particular frequency is integrally related to the vertical sync pulse and horizontal sync pulse frequencies;

first digital counter means responsive to the signals at the fourth particular frequency for providing signals at a sixth particular frequency integrally related to the vertical sync pulse frequency and the fourth particular frequency;

second digital counter means responsive to the signals at the fourth particular frequency for providing signals at a seventh particular frequency integrally related to the horizontal sync pulse frequency and the fourth particular frequency;

third means responsive to the signals at the sixth and seventh particular frequencies for combining these signals in a particular relationship to produce the signals at the fifth particular frequency; and fourth means operatively coupled to the first and third means for mixing the signals at the color subcarrier frequency and at the fifth particular frequency to produce the signals at the fourth particular frequency.

15. In the combination set forth in claim 14, the second means including an oscillator and the third means including a balanced modulator and the fourth means including a balanced modulator.

16. In the combination set forth in claim 14, the first digital counter means including means for producing a pair of signals at the sixth particular frequency with the pair of signals having a 90° phase relationship to each other and the second digital counter means further including means for producing a pair of signals at the seventh particular frequency with the pair of signals having a 90° phase relationship to each other and the third means including means for combining first signals in each pair of signals at the sixth and seventh particular frequencies and further including means for combining the other signals in each pair of signals at the sixth and seventh particular frequencies.

17. In the combination set forth in claim 16, the second means including an oscillator and the fourth means including a balanced modulator and the third means including one balanced modulator for combining the first signals in each pair of signals at the sixth and seventh particular frequencies and further including another balanced modulator for combining the other signals in each pair of signals at the sixth and seventh particular frequencies.